(12) United States Patent
Okutani et al.

(10) Patent No.: US 10,276,843 B2
(45) Date of Patent: Apr. 30, 2019

(54) BATTERY MODULE

(71) Applicant: Panasonic Intellectual Property Management Co., Ltd., Osaka (JP)

(72) Inventors: Oose Okutani, Hyogo (JP); Shinya Geshi, Osaka (JP); Hiroshi Takasaki, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 76 days.

(21) Appl. No.: 15/112,155

(22) PCT Filed: Dec. 22, 2014

(86) PCT No.: PCT/JP2014/006371
§ 371 (c)(1),
(2) Date: Jul. 15, 2016

(87) PCT Pub. No.: WO2015/118597
PCT Pub. Date: Aug. 13, 2015

(65) Prior Publication Data
US 2016/0336556 A1 Nov. 17, 2016

(30) Foreign Application Priority Data
Feb. 7, 2014 (JP) .................. 2014-022821

(51) Int. Cl.
*H01M 2/10* (2006.01)
*H01M 2/34* (2006.01)
(Continued)

(52) U.S. Cl.
CPC ......... *H01M 2/105* (2013.01); *H01M 2/1252* (2013.01); *H01M 2/204* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 2012/0263995 A1 | 10/2012 | Naito et al. | |
| 2013/0011719 A1* | 1/2013 | Yasui | H01M 2/0245 429/159 |
| 2013/0095356 A1 | 4/2013 | Shimizu et al. | |

FOREIGN PATENT DOCUMENTS

| | | |
|---|---|---|
| CN | 102812578 A | 12/2012 |
| CN | 103081164 A | 5/2013 |

(Continued)

OTHER PUBLICATIONS

International Search Report of PCT application No. PCT/JP2014/006371 dated Mar. 31, 2015.
(Continued)

*Primary Examiner* — Jonathan G Leong
*Assistant Examiner* — Christopher P Domone
(74) *Attorney, Agent, or Firm* — McDermott Will & Emery LLP

(57) ABSTRACT

A battery module includes a plurality of battery cells each having a safety mechanism, a cell case having a plurality of battery housing parts for housing the plurality of battery cells respectively in a predetermined arrangement, an insulating member disposed on one side of each of the battery cells, and a duct serving as a route for exhausting exhaust gas discharged from the battery cells. The battery housing parts have a plurality of openings for housing the battery cells. The insulating member has a through hole formed at a position facing an opening of the plurality of openings that houses corresponding one of the battery cells, and a lid part for closing an opening of the plurality of openings that houses no battery cell. The exhaust gas is discharged to the
(Continued)

route of the duct through the through hole of the insulating member.

6 Claims, 8 Drawing Sheets

(51) Int. Cl.
  *H01M 10/48* (2006.01)
  *H01M 2/12* (2006.01)
  *H01M 2/20* (2006.01)
(52) U.S. Cl.
  CPC ............. *H01M 2/34* (2013.01); *H01M 2/345* (2013.01); *H01M 10/486* (2013.01); *H01M 2200/20* (2013.01)

(56) References Cited

FOREIGN PATENT DOCUMENTS

| | | |
|---|---|---|
| JP | 2008-251472 | 10/2008 |
| JP | 2011-175844 | 9/2011 |
| JP | 2012-113899 | 6/2012 |
| JP | 2012-221844 | 11/2012 |
| JP | 2013-030384 | 2/2013 |
| WO | 2012/073403 | 6/2012 |

OTHER PUBLICATIONS

English Translation of Chinese Search Report dated Jun. 1, 2018 for the related Chinese Patent Application No. 201480074539.X.

* cited by examiner

VII-VII cross section

BATTERY MODULE

CROSS-REFERENCE TO RELATED APPLICATIONS

This application is a U.S. national stage application of the PCT International Application No. PCT/JP2014/006371 filed on Dec. 22, 2014, which claims the benefit of foreign priority of Japanese patent application 2014-022821 filed on Feb. 7, 2014, the contents all of which are incorporated herein by reference.

TECHNICAL FIELD

The present disclosure relates to a battery module in which a large number of arranged battery cells are housed and electrically connected to each other.

BACKGROUND ART

PTL 1 discloses a battery block in which in a metal casing having battery cell housing parts capable of housing a large number of battery cells, lithium ion battery cells of which a number is smaller than a number of the battery cell housing parts, are housed, and dummy cells having no electric energy are housed in housing parts housing no battery cell.

PTL 2 describes a pack battery configured to include a combination of a plurality of cell cases capable of housing a predetermined number of battery cells, and in the pack battery, a number of the battery cells housed in one of the cell cases is set to a number smaller than the predetermined number, and consequently an optimum output voltage or current capacity is realized according to uses.

CITATION LIST

Patent Literature

PTL 1: Unexamined Japanese Patent Publication No. 2012-221844
PTL 2: Unexamined Japanese Patent Publication No. 2008-251472

SUMMARY OF THE INVENTION

In a battery module configured to include a plurality of battery cells electrically connected to each other, it is desired that a number of the battery cells be flexibly changeable at a low cost and safety be maintained even in this case, in order to obtain a desired output voltage or current capacity according to uses, specifications, increase in capacity of battery cells, or the like.

A purpose of the present disclosure is to provide a battery module that is capable of flexibly coping with change in a number of battery cells at a low cost while safety is maintained.

A battery module according to the present disclosure includes a plurality of battery cells each having a safety mechanism on one side, a cell case having a plurality of battery housing parts for housing the plurality of battery cells respectively in a predetermined arrangement, an insulating member disposed on one side of each of the battery cells, and a duct serving as a route for exhausting exhaust gas discharged from the battery cells, and in the battery module, the battery housing parts have a plurality of openings for housing the battery cells, the insulating member has a through hole formed at a position facing an opening of the plurality of openings that houses corresponding one of the battery cells, and a lid part for closing an opening of the plurality of openings that houses no battery cell, and the exhaust gas is discharged to the route of the duct through the through hole.

According to a battery module of the present disclosure, it is possible to flexibly cope with change in a number of battery cells at a low cost while safety is maintained.

DESCRIPTION OF EMBODIMENT

Hereinafter, an exemplary embodiment according to the present disclosure will be described in detail with reference to the attached drawings. In this description, specific shapes, materials, values, directions, and the like are exemplified for ease of understanding of the present disclosure, and can be changed appropriately according to uses, purposes, specifications, and the like. Moreover, in a case where the following description includes a plurality of exemplary embodiments, modifications or the like, it is originally assumed that characteristic parts in the exemplary embodiments, the modifications or the like are appropriately combined and used.

Figure 1:
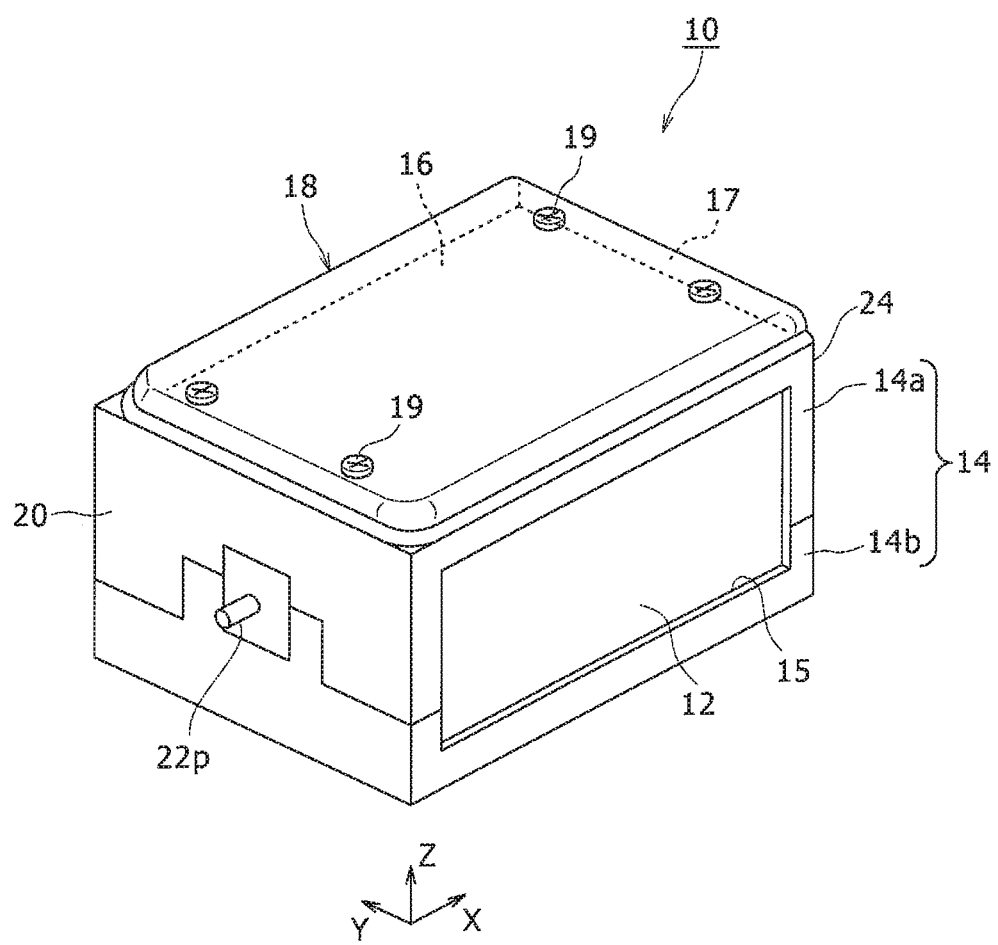
FIG. 1 is a perspective view of a battery module of this exemplary embodiment.

FIG. 1 is a perspective view of battery module 10 of this exemplary embodiment. Battery module 10 is constituted in a rectangular housing shape as a whole. In the following description, in FIG. 1 to FIG. 7, a longitudinal direction on a horizontal surface of battery module 10 is defined as length direction (X), a short direction on the horizontal surface is defined as width direction (Y), and a perpendicular direction is defined as height direction (Z).

Battery module 10 includes cell case 12 for housing a plurality of battery cells 11 (refer to FIG. 2) that is, for example, columnar or cylindrical, upper side module case 14a and lower side module case 14b that are combined with each other to constitute module case 14 for housing cell case 12 in module case 14, and duct cover 18 that is provided to cover an upper part of upper side module case 14a and that forms duct 16 which is an exhaust space. Duct 16 is in communication with exhaust vent 17 that is opened on one side in the length direction of battery module 10.

As shown in FIG. 1, on one side surface 20 of side surfaces facing each other in the length direction of battery module 10, positive electrode side output terminal 22p of battery module 10 is provided so as to protrude in a pin shape. Moreover, although not shown in FIG. 1, on other side surface 24 of the side surfaces facing each other in the length direction of battery module 10, negative electrode side output terminal 22n (refer to FIG. 4) of battery module 10 is provided so as to protrude in a similar pin shape.

Rectangular openings 15 are formed respectively on both side surfaces facing each other in the width direction of module case 14. Cell case 12 is exposed through openings 15. Consequently, heat radiation from cell case 12 to an outside, namely, cooling of battery module 10 is improved.

Figure 2:
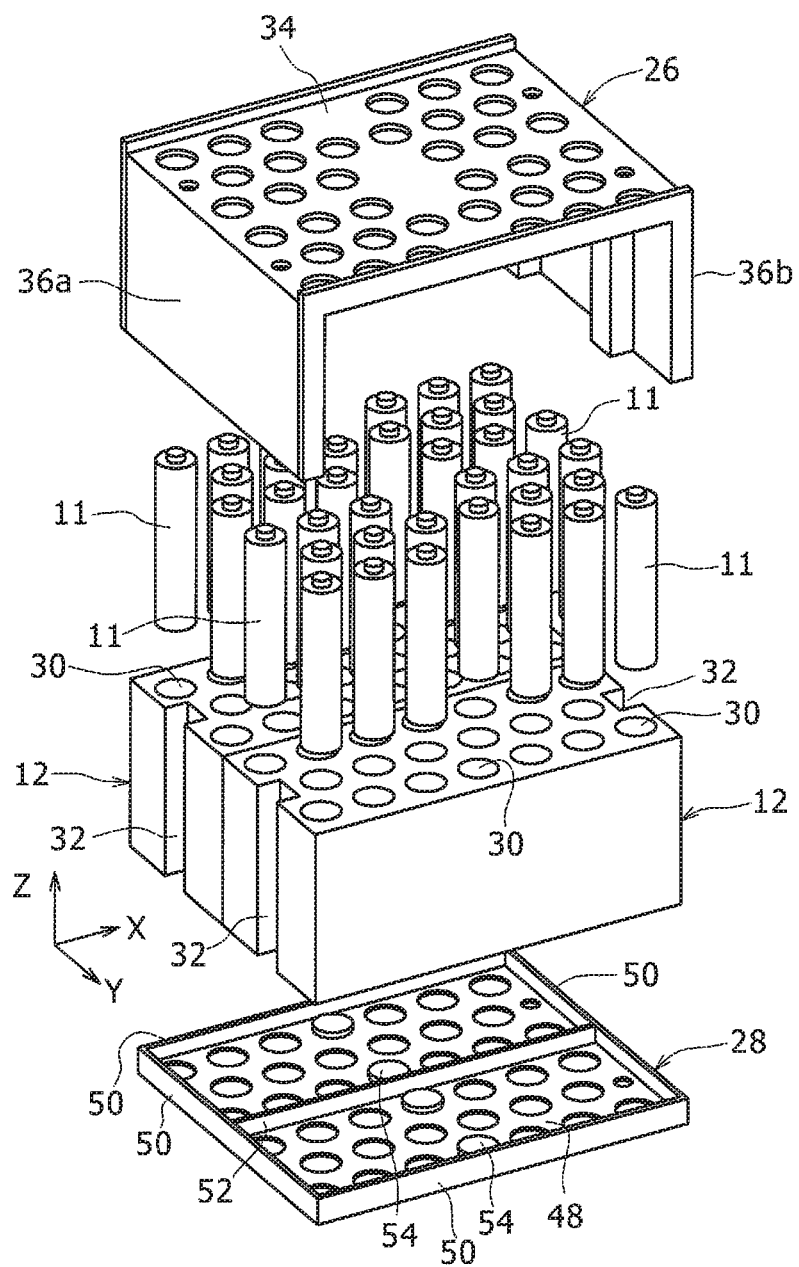
FIG. 2 is an exploded perspective view of battery cells, a cell case, an upper side holder, and a lower side holder that constitute the battery module.

FIG. 2 is an exploded perspective view of battery cells 11, cell case 12, upper side holder (insulating member) 26, and lower side holder (additional insulating member) 28 that constitute battery module 10. Assembled battery cells 11, cell case 12, upper side holder 26, and lower side holder 28 are housed in module case 14.

Battery cells 11 are single cells constituting battery module 10. In this exemplary embodiment, battery cells 11 are columnar, and each have a positive electrode part at an upper end, and a negative electrode part at a lower end. Moreover, for example, lithium ion batteries are appropriately used as battery cells 11. However, battery cells 11 are not limited to the lithium ion batteries, and nickel hydride batteries, sodium batteries, or the like may be used as battery cells 11. Moreover, in this exemplary embodiment, cylindrical battery cells are used as battery cells 11. However, battery cells 11 are not limited to the cylindrical battery cells, and prismatic battery cells may be used.

In this exemplary embodiment, a safety mechanism (not shown in the figures) is incorporated in the positive electrode part of each battery cell 11. The safety mechanism has a function of operating (for example, breaking a thin-walled part of a metal plate constituting a part of battery cell 11 to form an opening in the thin-walled part) to exhaust exhaust gas from battery cell 11 when internal pressure of battery cell 11 is increased to predetermined pressure or more. Note that the safety mechanism may be provided in the negative electrode part of battery cell 11, and battery cell 11 may be disposed such that the negative electrode part is directed to a duct 16 side, or a duct may be formed in a lower part of battery module 10.

Cell case 12 is a member for housing a predetermined number of arranged battery cells 11. Cell case 12 includes a substantially rectangular parallelepiped metal member. For example, a molded aluminum alloy can be used as cell case 12. Molding of cell case 12 is performed by a processing method such as cutting, or die molding such as extrusion and casting. Moreover, grooves 32 extending along a height direction are formed respectively on side surfaces facing each other in the length direction of cell case 12.

In this exemplary embodiment, cell case 12 has twenty battery housing parts 30. Each battery housing part 30 is formed as a through hole extending in the height direction of cell case 12. More specifically, battery module 10 houses two cell cases 12 arranged in the width direction. In each cell case 12, two lines each made by seven battery housing parts 30 are formed along the length direction, and one line of six battery housing parts 30 is formed between the two lines. Six battery housing parts 30 are disposed so as to be located between the two lines each made by seven battery housing parts 30, when battery housing parts 30 are viewed from the width direction. Consequently, it is possible to house battery cells 11 in cell case 12 in a staggered (zigzag) arrangement, and it is possible to reduce a dimension in the width direction of cell case 12.

As described above, since 7+6+7=20 battery housing parts 30 are formed in each cell case 12, each cell case 12 is capable of housing 20 battery cells 11. However, in this exemplary embodiment, each cell case 12 houses 18 battery cells 11, and battery module 10 is configured to include 36 battery cells 11. That is, two battery housing parts 30 in each cell case 12 house no battery cell 11.

In this exemplary embodiment, a height of each cell case 12 is almost the same as a height of each battery cell 11. Consequently, when battery cells 11 are housed in cell cases 12, the positive electrode parts and the negative electrode parts of battery cells 11 are exposed to upper and lower openings of battery housing parts 30. Note that each cell case 12 may have a shape so as to house at least a part of each battery cell 11. Moreover, a positional relation among each cell case 12, the positive electrode parts and the negative electrode parts of battery cells 11, and battery housing parts 30 of cell case 12 appropriately changes depending on a shape of cell case 12.

Upper side holder 26 is an insulating member disposed on a positive electrode part side of each battery cell 11 housed in cell cases 12. Upper side holder 26 is integrally molded by using, for example, a resin material having an insulation property, a heat-resisting property, and strength necessary for battery module 10, and has top plate part 34 and side wall parts 36a, 36b that form a portal.

Figure 3A:
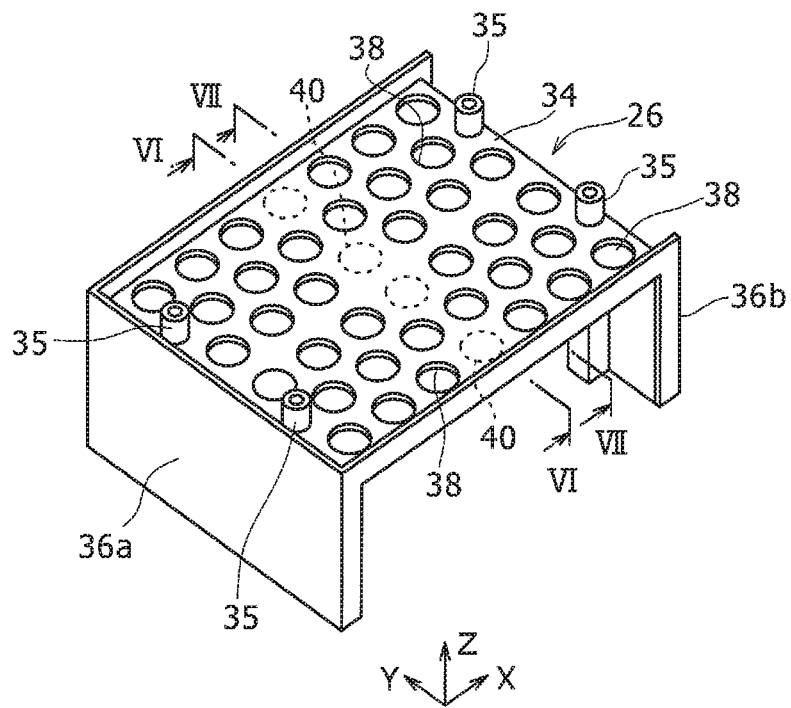
FIG. 3A is a perspective view as the upper side holder is viewed from above.
Figure 3B:
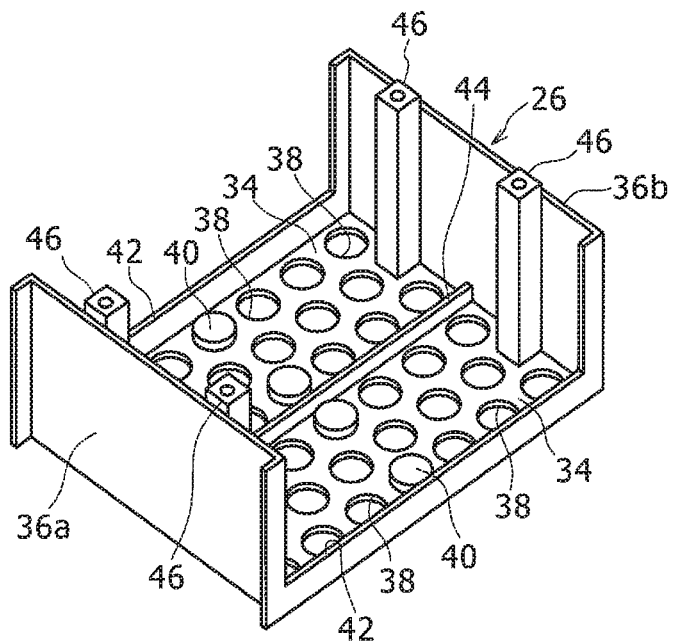
FIG. 3B is a perspective view of the reversed upper side holder.

FIG. 3A is a perspective view as upper side holder 26 is viewed from above, and FIG. 3B is a perspective view of reversed upper side holder 26. A plurality of through holes 38 is formed in top plate part 34 of upper side holder 26. Specifically, through holes 38 of top plate part 34 are formed at positions corresponding to the positive electrode parts of battery cells 11 housed in cell cases 12.

In this exemplary embodiment, 18 battery cells 11 are housed in each cell case 12 having 20 battery housing parts 30. That is, two battery housing parts 30 in each cell case 12 house no battery cell 11. Specifically, among battery housing parts 30 formed in each cell case 12, no battery cell 11 is housed in battery housing parts 30 located at centers in the length direction of the two lines each made by seven battery housing parts 30 along the length direction. Accordingly, top plate part 34 of upper side holder 26 has no through hole formed at positions corresponding to battery housing parts 30 housing no battery cell 11, and lid parts 40 for closing upper end openings of battery housing parts 30 housing no battery cell 11 are formed in top plate part 34.

Lid parts 40 of upper side holder 26 are located corresponding to the positions of battery housing parts 30 housing no battery cell 11. In battery module 10 of this exemplary embodiment, no battery cell 11 is housed in battery housing part 30 located at the center in the length direction of the line of seven battery housing parts 30 of each cell case 12. For this reason, top plate part 34 of upper side holder 26 has one line of four lid parts 40 formed along the width direction at central positions in the length direction.

Upper side holder 26 of this exemplary embodiment has lid parts 40 that are formed as protrusions protruding in disk shapes on an undersurface of top plate part 34. Consequently, in assembled battery module 10, lid parts 40 are fitted in and close the upper end openings of battery housing parts 30 housing no battery cell 11 in cell cases 12. Details of this fitting state will be described below with reference to FIG. 6.

As shown in FIG. 3B, low standing wall parts 42 are formed respectively on edge parts in the width direction of top plate part 34 of upper side holder 26, and low partition wall 44 extending along the length direction stands at a center in the width direction of top plate part 34. In assembled battery module 10, the standing wall parts are engaged with peripheries of upper end parts of cell cases 12, and partition wall 44 is fitted between two cell cases 12. Moreover, two column parts 46 are integrally formed with each of facing inner surfaces of side wall parts 36a, 36b of upper side holder 26. In assembled battery module 10, column parts 46 are fitted into grooves 32 (refer to FIG. 2) of cell cases 12 to position upper side holder 26, and side wall parts 36a, 36b are in contact with end surfaces in the length direction of cell cases 12. In assembled battery module 10, upper side holder 26 having standing wall parts 42, partition wall 44, and side wall parts 36a, 36b has a function of holding upper end parts of cell cases 12 housing battery cells 11. Moreover, side wall parts 36a, 36b of upper side holder 26 are located between respective current collecting parts of a positive electrode side current collector and a negative electrode side current collector described below, and cell cases 12, and have a function of insulating the current collecting parts from cell cases 12.

Four fixing bosses 35 stand on top plate part 34 of upper side holder 26, and a male screw hole is formed on an upper end surface of each fixing boss 35. Moreover, side wall parts 36a, 36b of upper side holder 26 are located corresponding to fixing bosses 35, and male screw holes are formed on lower end surfaces thereof, respectively.

Again with reference to FIG. 2, lower side holder 28 is an insulating member disposed on a negative electrode part side of each battery cell 11 housed in cell cases 12. Lower side holder 28 is integrally molded by using, for example, a resin material having an insulation property, a heat-resisting property, and strength necessary for battery module 10.

Lower side holder 28 has rectangular bottom plate part 48, low standing wall parts 50 standing on four-directional edge parts of bottom plate part 48, and partition wall 52 standing along the length direction at a center in the width direction of bottom plate part 48. In assembled battery module 10, standing wall parts 50 of lower side holder 28 are engaged with peripheries of lower end parts of cell cases 12, and partition wall 52 is fitted between two cell cases 12. Consequently, lower side holder 28 also has a function of holding the lower end parts of cell cases 12 housing battery cells 11.

Lid parts 54 protruding in disk shapes are provided also in bottom plate part 48 of lower side holder 28, in a similar manner to the disposition of lid parts 40 of upper side holder 26. Lid parts 54 of lower side holder 28 are fitted in and close lower end openings of battery housing parts 30 housing no battery cell 11 in cell cases 12. A fitting state of lid parts 54 will be described below with reference to FIG. 6.

Figure 4:
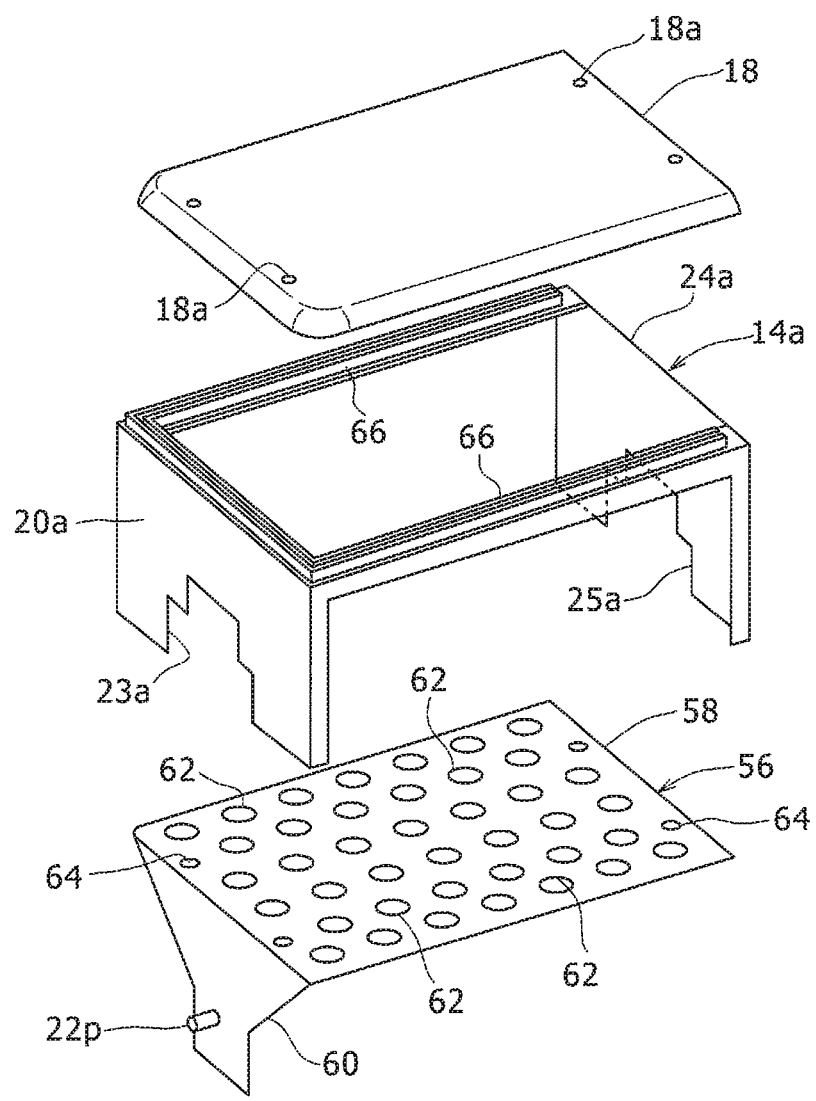
FIG. 4 is an exploded perspective view of a positive electrode current collector, an upper side module case, and a duct cover that constitute an upper part of the battery module.

FIG. 4 is an exploded perspective view of positive electrode current collector 56, upper side module case 14a, and duct cover 18 that constitute an upper part of battery module 10.

Positive electrode current collector 56 includes a conductive metal plate such as an aluminum plate, a nickel plate, and a copper plate. Positive electrode current collector 56 has lead forming part 58, and current collecting part 60 which is formed so as to be bent substantially vertically to lead forming part 58 and to which positive electrode side output terminal 22p is attached.

Lead parts 62 of which a number corresponds to a number of battery housing parts 30 of cell cases 12 are formed in lead forming part 58 of positive electrode current collector 56. That is, in this exemplary embodiment, three lines made respectively by seven, six, and seven lead parts 62, namely, a total of 20 lead parts 62, are formed corresponding to each cell case 12. Therefore, 40 lead parts 62 are formed as a whole in positive electrode current collector 56.

Although not shown in FIG. 4, each lead part 62 has a flake-like connection part sectioned by a substantially U-shaped cut-away part formed in the lead forming part, and this connection part is metallurgically joined to the positive electrode parts of battery cells 11 through through holes 38 of upper side holder 26. This joining is performed by resistance welding, ultrasonic welding, laser welding, or the like. Consequently, the positive electrode parts of all battery cells 11 included in battery module 10 are connected in parallel through positive electrode current collector 56, and current can be input/output through positive electrode side output terminal 22p of current collecting part 60. Note that top plate part 34 of upper side holder 26 is interposed between a part other than lead parts 62 of lead forming part 58 and battery cells 11, and consequently the part other than lead parts 62 of lead forming part 58 is not in contact with battery cells 11.

Four boss insertion holes 64 are formed in lead forming part 58 of positive electrode current collector 56, and fixing bosses 35 (refer to FIG. 3A and FIG. 3B) of the upper side holder are inserted into boss insertion holes 64, and consequently positive electrode current collector 56 is positioned.

Upper side module case 14a is integrally molded as an insulating member. Upper side module case 14a has side wall parts 20a, 24a forming respective upper side parts of one side surface 20 and other side surface 24 facing each other in the length direction of battery module 10. Recess portions 23a, 25a into which projections of side wall parts of the lower side module case described below are fitted, are formed in side wall parts 20a, 24a, respectively.

Upper side module case 14a has two binding parts 66 bound to respective upper end corner parts of side wall parts 20a, 24a. Binding parts 66 are disposed so as to insulate positive electrode current collector 56 from duct cover 18, together with side wall parts 20a, 24a.

Duct cover 18 is formed of a metal plate such as aluminum and iron. Four screw holes 18a are formed in duct cover 18, and in assembled battery module 10, screws 19 (refer to FIG. 1) are inserted into screw holes 18a to be fastened to fixing bosses 35 of upper side holder 26, and consequently duct cover 18 is fixed.

Duct 16 that is a space for exhausting, from battery module 10, high temperature exhaust gas which may be ejected from battery cells 11, is formed between duct cover 18 and positive electrode current collector 56 (refer to FIG. 1). Both sides in the width direction and one side in the length direction of battery module 10 are closed by side wall parts 20a, 24a and binding parts 66 of upper side module case 14a, and duct 16 can exhaust the exhaust gas ejected from battery cells 11 from exhaust vent 17 provided on the other side in the length direction to the outside.

Figure 5:
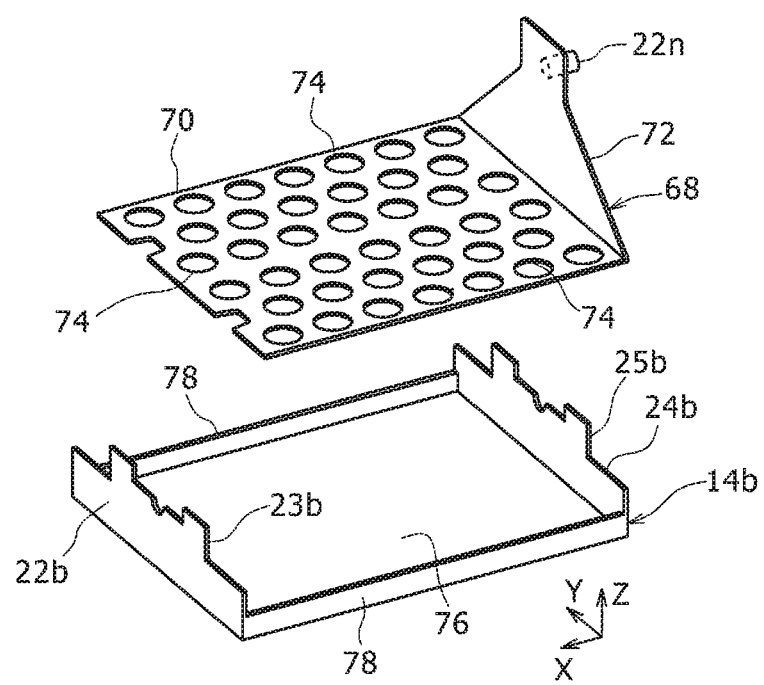
FIG. 5 is an exploded perspective view of a negative electrode current collector, and a lower side module case that constitute a lower part of the battery module.

FIG. 5 is an exploded perspective view of negative electrode current collector 68 and lower side module case 14b that constitute a lower part of battery module 10. Negative electrode current collector 68 includes a conductive metal plate such as an aluminum plate, a nickel plate, and a copper plate. Negative electrode current collector 68 has lead forming part 70, and current collecting part 72 which is formed so as to be bent substantially vertically to lead forming part 70 and to which negative electrode side output terminal 22n is attached. Current collecting part 72 and negative electrode side output terminal 22n of negative electrode current collector 68 are located on a side opposite in the length direction to current collecting part 60 and positive electrode side output terminal 22p of positive electrode current collector 56.

Lead parts 74 of which a number corresponds to a number of battery housing parts 30 of cell cases 12 are formed in lead forming part 70 of negative electrode current collector 68. The number and forming positions of lead parts 74 are similar to the number and forming positions of positive electrode current collector 56. Therefore, the negative electrode parts of all battery cells 11 included in battery module 10 are connected in parallel through negative electrode current collector 68, and current can be input/output through negative electrode side output terminal 22n of current collecting part 72. Note that bottom plate part 48 of lower side holder 28 is interposed between a part other than lead parts 74 of lead forming part 70 in negative electrode current collector 68 and battery cells 11, and the part other than lead parts 74 of lead forming part 70 in negative electrode current collector 68 is not in contact with battery cells 11.

Lower side module case 14b is integrally molded as an insulating member. Lower side module case 14b has bottom plate part 76 constituting a bottom part of battery module 10, side wall parts 20b, 24b standing on both sides in the length direction of bottom plate part 76, and low standing wall parts 78 standing on edge parts in the width direction of bottom plate part 76.

Projections 23b, 25b are formed in side wall parts 20b, 24b of lower side module case 14b, respectively, and projections 23b, 25b are fitted into recess portions 23a, 25a of side wall parts 20a, 20b of upper side module case 14a in a flush state, and consequently one side surface 20 and other side surface 24 of battery module 10 are formed.

Figure 6:
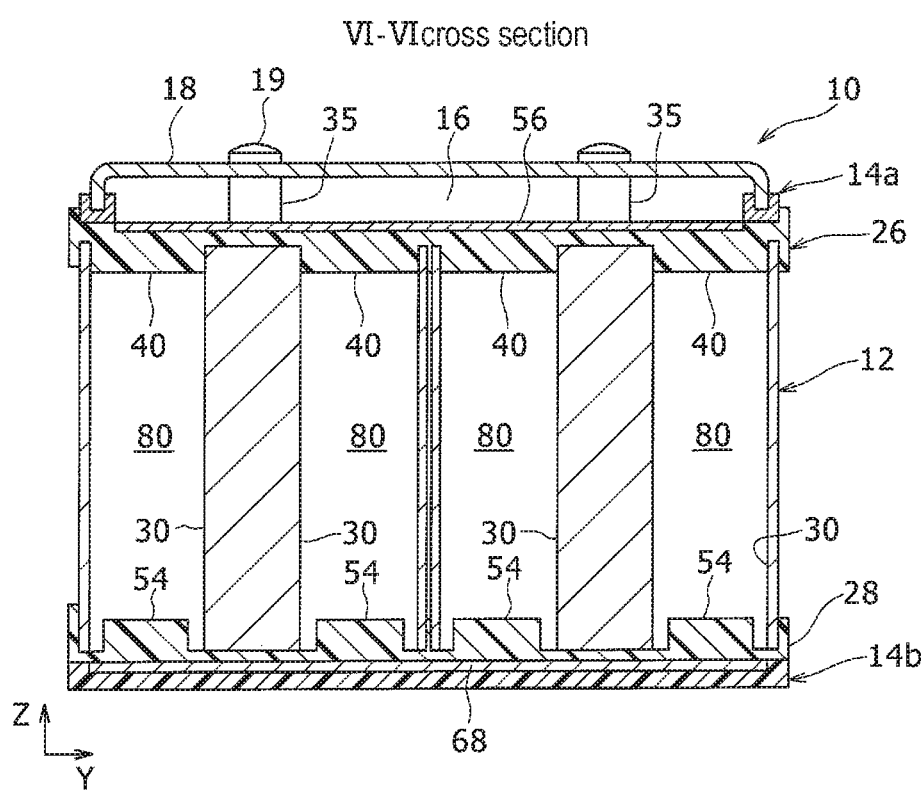
FIG. 6 is a sectional view taken along VI-VI in FIG. 3A in the assembled battery module.
Figure 7:
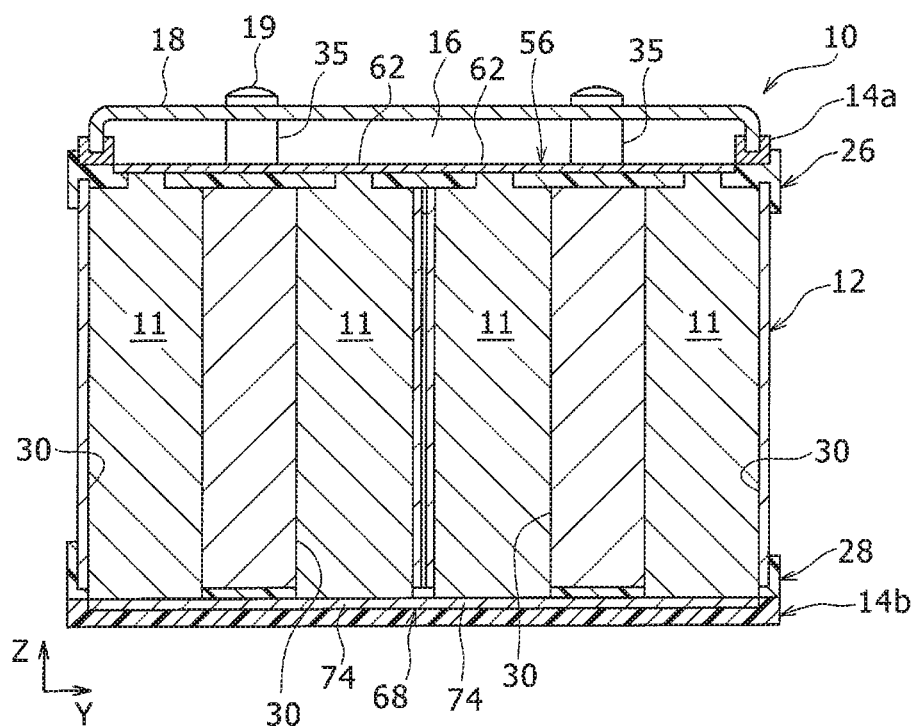
FIG. 7 is a sectional view taken along VII-VII in FIG. 3A in the assembled battery module.

FIG. 6 is a sectional view taken along VI-VI in FIG. 3A in assembled battery module 10. Moreover, FIG. 7 is a sectional view taken along VII-VII in FIG. 3A in assembled battery module 10. Specifically, FIG. 6 is a sectional view at a position where four battery housing parts 30 housing no battery cell 11 are arranged in the width direction in cell cases 12, and FIG. 7 is a sectional view at a position where four battery cells 11 housed in battery housing parts 30 are arranged in the width direction in cell cases 12.

As shown in FIG. 6, in battery module 10 of this exemplary embodiment, no battery cell 11 is housed in two battery housing parts 30 located respectively in central regions in the length direction of two cell cases 12, namely, in a total of four battery housing parts 30, and insides of battery housing parts 30 are spaces 80. Lid parts 40 provided so as to protrude on upper side holder 26 are fitted in and close the upper end openings of battery housing parts 30 housing no battery cell 11.

Lid parts 40 are preferably fitted in airtight states or in high pressure loss states to battery housing parts 30. In this manner, when the safety mechanisms of battery cells 11 incorporated in battery module 10 operate, and exhaust gas is ejected to duct 16 through through holes 38 of upper side holder 26 and lead parts 62 of positive electrode current collector 56, it is possible to suppress entrance of the exhaust gas into battery housing parts 30 housing no battery cell. Therefore, it is possible to exhaust the high temperature exhaust gas in a desired route, namely, from exhaust vent 17 of duct 16 to the outside of the module. As a result, it is possible to maintain safety of battery module 10 also in a case where a number of battery cells 11 is made less than a maximum housing allowable number.

As shown in FIG. 6, lid parts 54 provided so as to protrude on lower side holder 28 are fitted in and close the lower end openings of battery housing parts 30 housing no battery cell 11 in cell cases 12. Consequently, it is possible to reliably prevent inflow of high temperature gas into battery housing parts 30 in which no battery cell 11 is disposed, together with lid parts 40 of upper side holder 26.

However, lid parts 54 of lower side holder 28 may be fitted loosely with a gap between the lower end openings of battery housing parts 30 and lid parts 54, namely, may be fitted in a low pressure loss state, as compared to lid parts 40 of upper holder 26. The gap is formed in this manner, and consequently lower side holder 28 and cell cases 12 can be assembled easily, and cell cases 12 can also be positioned generally or roughly. Moreover, wiring lines of temperature sensors described below can also be drawn out through the gap between the openings of battery housing parts 30 and lid parts 54.

As described above, according to battery module 10 of this exemplary embodiment, lid parts 40 provided in upper side holder 26 close the openings of battery housing parts 30 housing no battery cell 11 in cell cases 12, and for this reason, also in a case where high temperature gas is ejected from the safety mechanisms of battery cells 11, it is possible to effectively prevent inflow of the high temperature gas into battery housing parts 30 housing no cell and the high temperature gas can flow to exhaust vent 17 of duct 16. Consequently, it is possible to maintain safety of battery module 10 having battery housing parts 30 housing no cells.

For example, lid parts 40 of upper side holder 26 can be molded integrally with upper side holder 26 by detachably attaching pin dies for forming through holes 38 of upper side holder 26 to one of a male die and a female die of a metal mold used when resin molding of upper side holder 26 is performed, and by removing the pin dies present at positions corresponding to the battery housing parts housing no battery cell. The same applies to lid parts 54 of lower side holder 28. According to battery module 10 of this exemplary embodiment, simple design change of two components, namely, upper side holder 26 and lower side holder 28 makes it possible to flexibly cope with increase/reduction in the number of battery cells according to uses, specifications, or the like, and makes it possible to significantly reduce a cost and time necessary for design change. Since no dummy cell is used, there is also an advantage that a cost and assembly work for the dummy cells can be eliminated.

In this exemplary embodiment, battery housing parts 30 housing no battery cell 11 are disposed in line in the central regions in the length direction of cell cases 12. Battery housing parts 30 housing no battery cell 11 are disposed in line in the central regions in the length direction in this manner, and consequently it become easy to balance weight of battery module 10. Battery housing parts 30 housing no battery cell 11 are arranged in line as described above, and consequently there is an advantage that positioning in formation and assembling of lid parts 40, 54 of upper side holder 26 and lower side holder 28 becomes easy.

Note that the battery module according to the present disclosure is not limited to the above exemplary embodiment and the above modification of the exemplary embodiment, and various improvements and modifications can be made within matters described in the claims of the present application, and within an equalized range thereof.

Figure 8A:
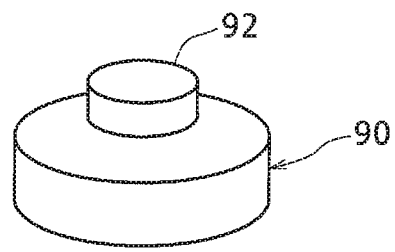
FIG. 8A is a perspective view showing a modification of a lid part provided in the upper side holder.
Figure 8B:
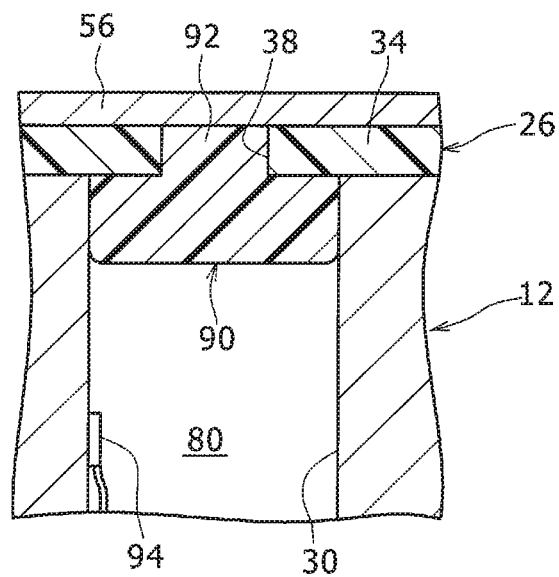
FIG. 8B is an assembly sectional view showing the modification of the lid part provided in the upper side holder.

In the above description, lid parts 40 of upper side holder 26 are integrally molded. However, lid parts 40 are not limited to this. For example, as shown in FIGS. 8(a) and 8(b), lid part 90 may be molded separately, and columnar protrusion 92 of lid part 90 may be fitted in a through hole of upper side holder 26 corresponding to a battery housing part housing no battery cell, and may be fixed by adhesion or the like. In this case, lid part 90 may be fixed to lower side holder 28 by adhesion or the like, similarly. In this manner, design change of upper side holder 26 and lower side holder 28 associated with change in the number of battery cells in battery module 10 becomes unnecessary, and it is possible to easily increase/reduce the number of battery cells at a low cost.

Moreover, as shown in FIG. 8B, temperature sensor 94 may be disposed on an inner wall surface of battery housing part 30 housing no battery cell 11 in cell case 12 by adhesion or the like, and a state of battery module 10 may be monitored based on a temperature detected by this temperature sensor.

Moreover, in the above description, lid parts 40 of upper side holder 26 and lid parts 54 of lower side holder 28 are formed as protrusions, and are fitted in and close the openings of battery housing parts 30. However, as long as the openings of battery housing parts 30 are closed, flat-plate-like non openings of top plate part 34 of upper side holder 26 may be employed.

Moreover, in the above description, lid parts 40, 54 are disposed in a line. However, lid parts 40, 54 may be disposed according to battery housing parts 30 housing no battery cell 11 in cells case 12, and may be provided at zigzag positions, spaced apart positions, or the like.

Further, for example, in a case where a heavy member such as a lead bar and an iron bar may be housed in a part of or all of battery housing parts 30 housing no battery cell 11 in cell case 12, and a plurality of battery modules each having a different number of battery cells is combined to form an electrical storage device, weight of the battery modules may be balanced.

The invention claimed is:

1. A battery module comprising:
   a plurality of battery cells each having a safety mechanism;
   a cell case having a plurality of battery housing parts for housing the plurality of battery
   cells respectively in a predetermined arrangement;
   an insulating member disposed on one side of each of the battery cells; and
   a duct serving as a route for exhausting exhaust gas discharged from the battery cells,
   wherein
   the battery housing parts have a plurality of openings for housing the battery cells, the insulating member has a through hole formed at a position facing an opening among the plurality of openings that houses corresponding one of the battery cells, and a lid part for closing an opening among the plurality of openings that houses no battery cell,
   the lid part closes the opening in an airtight state, and
   the exhaust gas is discharged to the route of the duct through the through hole.

2. The battery module according to claim 1, wherein
   the lid part of the insulating member is formed as a protrusion fitted in the opening of one of the battery housing parts.

3. The battery module according to claim 2, wherein
   the lid part is molded integrally with or separately from the insulating member.

4. The battery module according to claim 1, wherein
   the battery housing part housing no battery cell in the cell case is set in a central region in a longitudinal direction of the battery module, and a position of the lid part of the insulating member is set to a position according to the battery housing part housing no battery cell.

5. The battery module according to claim 1, further comprising an additional insulating member disposed between an electrode part on the other side of each battery cell housed in the cell case, and a current collector on the other side, wherein
   the other side current collector has a lead part connected to the other side electrode part of each battery cell through a through hole formed in the additional insulating member, and the additional insulating member has a lid part that is fitted in and closes an opening on the other side of the battery housing part housing no battery cell.

6. The battery module according to claim 1, wherein
   a temperature sensor for detecting a cell case temperature is installed on an inner wall of the battery housing part housing no battery cell.

* * * * *